United States Patent
Ariki et al.

(10) Patent No.: US 8,048,203 B2
(45) Date of Patent: Nov. 1, 2011

(54) METHOD OF PRODUCING CHLORINE GAS, AQUEOUS SODIUM HYPOCHLORITE SOLUTION AND LIQUID CHLORINE

(75) Inventors: Yusaku Ariki, Hyogo (JP); Hironobu Ibaraki, Hyogo (JP)

(73) Assignee: Kaneka Corporation, Osaka (JP)

(*) Notice: Subject to any disclaimer, the term of this patent is extended or adjusted under 35 U.S.C. 154(b) by 676 days.

(21) Appl. No.: 12/083,254

(22) PCT Filed: Apr. 14, 2006

(86) PCT No.: PCT/JP2006/307925
§ 371 (c)(1),
(2), (4) Date: Apr. 8, 2008

(87) PCT Pub. No.: WO2007/043203
PCT Pub. Date: Apr. 19, 2007

(65) Prior Publication Data
US 2008/0224094 A1    Sep. 18, 2008

(30) Foreign Application Priority Data
Oct. 14, 2005  (JP) .................................. 2005-300751

(51) Int. Cl.
*B01D 53/14*    (2006.01)

(52) U.S. Cl. ............................... 95/233; 423/241; 62/606

(58) Field of Classification Search .................... 95/233; 252/182.32; 423/500, 241; 62/606
See application file for complete search history.

(56) References Cited

U.S. PATENT DOCUMENTS

| | | | | |
|---|---|---|---|---|
| 2,318,512 A | * | 5/1943 | McHaffie | 423/500 |
| 4,119,413 A | * | 10/1978 | Larsen et al. | 95/182 |
| 4,254,092 A | * | 3/1981 | Coenen et al. | 423/497 |
| 4,299,606 A | * | 11/1981 | Robota et al. | 62/620 |
| 4,349,525 A | * | 9/1982 | Yamashita et al. | 423/488 |
| 4,830,846 A | * | 5/1989 | Jackson et al. | 423/488 |
| 5,437,711 A | * | 8/1995 | Kaplin et al. | 95/182 |

(Continued)

FOREIGN PATENT DOCUMENTS

JP    50-128696 A    10/1975

(Continued)

OTHER PUBLICATIONS

"Perry's Chemical Enginner's Handbook", 6th Ed, p. 13-9, 13-10, McGraw-Hill Inc.*

(Continued)

*Primary Examiner* — Duane Smith
*Assistant Examiner* — Ives Wu
(74) *Attorney, Agent, or Firm* — Hamre, Schumann, Mueller & Larson, P.C.

(57) ABSTRACT

It is intended to provide methods of producing a chlorine gas having a small bromine content, an aqueous sodium hypochlorite solution having a small bromic acid content, and liquid chlorine having a small bromine content. More specifically, a chlorine gas is produced by a method comprising the steps of: (A) washing a chlorine gas that contains bromine, in a gas washing unit composed of a packed column or a tray tower, wherein the chlorine gas introduced via a lower part of the gas washing unit is brought into counterflow gas/liquid contact with a liquid chlorine introduced via an upper part of the gas washing unit; and (B) taking out a purified chlorine gas thus washed, via the upper part of the gas washing unit, wherein a weight ratio of the chlorine gas and the liquid chlorine introduced in the step (A) is 1/1.0 to 1/0.3.

14 Claims, 1 Drawing Sheet

U.S. PATENT DOCUMENTS

| | | | |
|---|---|---|---|
| 2002/0159945 A1 * | 10/2002 | Burghardt et al. | 423/488 |
| 2003/0019360 A1 * | 1/2003 | Krissmann et al. | 95/233 |
| 2003/0108468 A1 * | 6/2003 | Schlafer et al. | 423/240 R |

FOREIGN PATENT DOCUMENTS

| | | | |
|---|---|---|---|
| JP | 59-092903 A | | 5/1984 |
| JP | 2002-316804 | * | 10/2002 |
| JP | 2002-316804 A | | 10/2002 |
| JP | 2004-2142 A | | 1/2004 |
| JP | 2004-051431 A | | 2/2004 |
| JP | 2005-314132 | * | 4/2004 |
| JP | 2005-314132 A | | 11/2005 |
| WO | WO 2004/018355 A1 | * | 3/2004 |

OTHER PUBLICATIONS

Chemical Engineer's Handbook, 6th Edition, p. 13-10.*

* cited by examiner

METHOD OF PRODUCING CHLORINE GAS, AQUEOUS SODIUM HYPOCHLORITE SOLUTION AND LIQUID CHLORINE

TECHNICAL FIELD

The present invention relates to methods of producing a chlorine gas, an aqueous sodium hypochlorite solution, and liquid chlorine. More specifically, the present invention relates to a method of producing a chlorine gas having a smaller bromine content by purifying a chlorine gas so as to remove bromine contained in the chlorine gas, to methods of producing an aqueous sodium hypochlorite solution having a smaller bromic acid content, and a liquid chlorine having a smaller bromine, by using the chlorine gas obtained by the foregoing chlorine gas producing method.

BACKGROUND ART

Conventionally, electrolysis of a salt solution has been performed widely for the purpose of producing chlorine, hydrogen, and caustic soda. Chlorine generated by electrolysis is used in the production of sodium hypochlorite, hydrochloric acid, and liquid chlorine. Since common salt used as a raw material in electrolysis usually contains bromine derived from bromides as impurities, chlorine generated therefrom contains bromine as impurities.

When sodium hypochlorite is produced industrially, the above-described chlorine generated by electrolysis is used as a raw material. Therefore, in the disinfection of drinking water, which is the main purpose for sodium hypochlorite, and the like, it is necessary to reduce the concentration of bromic acid generated with bromine to a certain reference value or below. As a method for reducing the bromine concentration in chlorine to or below a reference value set currently in Japan, a method of washing chlorine having a bromine concentration of not more than 2500 ppm with water containing substantially no bromine, in an amount of one time or more by weight with respect to chlorine, has been disclosed (e.g. JP 59 (1984)-92903 A). With this method, the bromine removal achieved by this method is at a level achieving the purpose with respect to the current reference value of the bromic acid concentration in sodium hypochlorite used in the disinfection of drinking water, etc. However, to achieve the purpose, a large amount of water is necessary for washing chlorine that contains bromine, which results in a large amount of chlorine water containing bromine as a by-product. Therefore, there arises a problem of disposing the by-produced chlorine water. Further, to preparing for the future demand for further reducing the amount of bromic acid remaining in sodium hypochlorite to be used in the disinfection of drinking water, a further technical innovation for reducing bromine contained in a chlorine gas is needed.

On the other hand, in the case where an organic chlorine compound is produced using a chlorine gas that contains bromine, an organic bromine compound generated with bromine as impurities is by-produced. This organic bromine compound has a property of being decomposed more easily by heat or light as compared with chlorine compounds of the same halogen group. Therefore, the organic bromine compound causes a chlorine compound as a product to degrade or discolor, causes an apparatus to be corroded, and functions as a catalyst poison with respect to a catalyst. Thus, bromine in chlorine contaminates a product formed from chlorine, and decreases the reactivity of an intermediate product formed from chlorine, thereby affecting the production of a final product. Recently, in the production of an organic chlorine compound product in particular, such chlorine having a smaller content of bromine as impurities is needed, and a new technique for reducing bromine contained in a chlorine gas is needed.

DISCLOSURE OF INVENTION

It is an object of the present invention to provide methods of producing a chlorine gas having a smaller content of bromine, an aqueous sodium hypochlorite solution having a smaller content of bromic acid, and a liquid chlorine having a smaller content of bromine.

The present invention relates to a method for producing a chlorine gas, which method includes the steps of:

(A) washing a chlorine gas that contains bromine, in a gas washing unit composed of a packed column or a tray tower, wherein the chlorine gas introduced via a lower part of the gas washing unit is brought into counterflow gas/liquid contact with a liquid chlorine introduced via an upper part of the gas washing unit; and (B) taking out a purified chlorine gas thus washed, via the upper part of the gas washing unit, wherein a weight ratio of the chlorine gas and the liquid chlorine introduced in the step (A) is 1/1.0 to 1/0.3.

The foregoing method preferably further includes the step of:

(C) liquefying the purified chlorine gas taken out via the upper part of the gas washing unit, by using a liquefaction unit, whereby a liquid chlorine is obtained, wherein in the step (A), the liquid chlorine obtained in the step (C) is introduced via the upper part of the gas washing unit.

In the step (C), the purified chlorine gas to be liquefied preferably is 50 to 90 wt % of the purified chlorine gas taken out in the step (B).

In the step (A), 50 to 100 wt % of the liquid chlorine obtained in the step (C) preferably is introduced via the upper part of the gas washing unit.

Further, the present invention relates to a method for producing an aqueous sodium hypochlorite solution having a bromic acid content of not more than 30 mg/L, which method includes the step of causing the chlorine gas obtained by the above-described method, and an aqueous sodium hydroxide solution to react with each other.

Still further, the present invention relates to a method for producing a liquid chlorine having a bromine content of not more than 10 ppm by weight, which method includes the step of liquefying the chlorine gas obtained by the above-described method.

DESCRIPTION OF THE INVENTION

Figure 1:
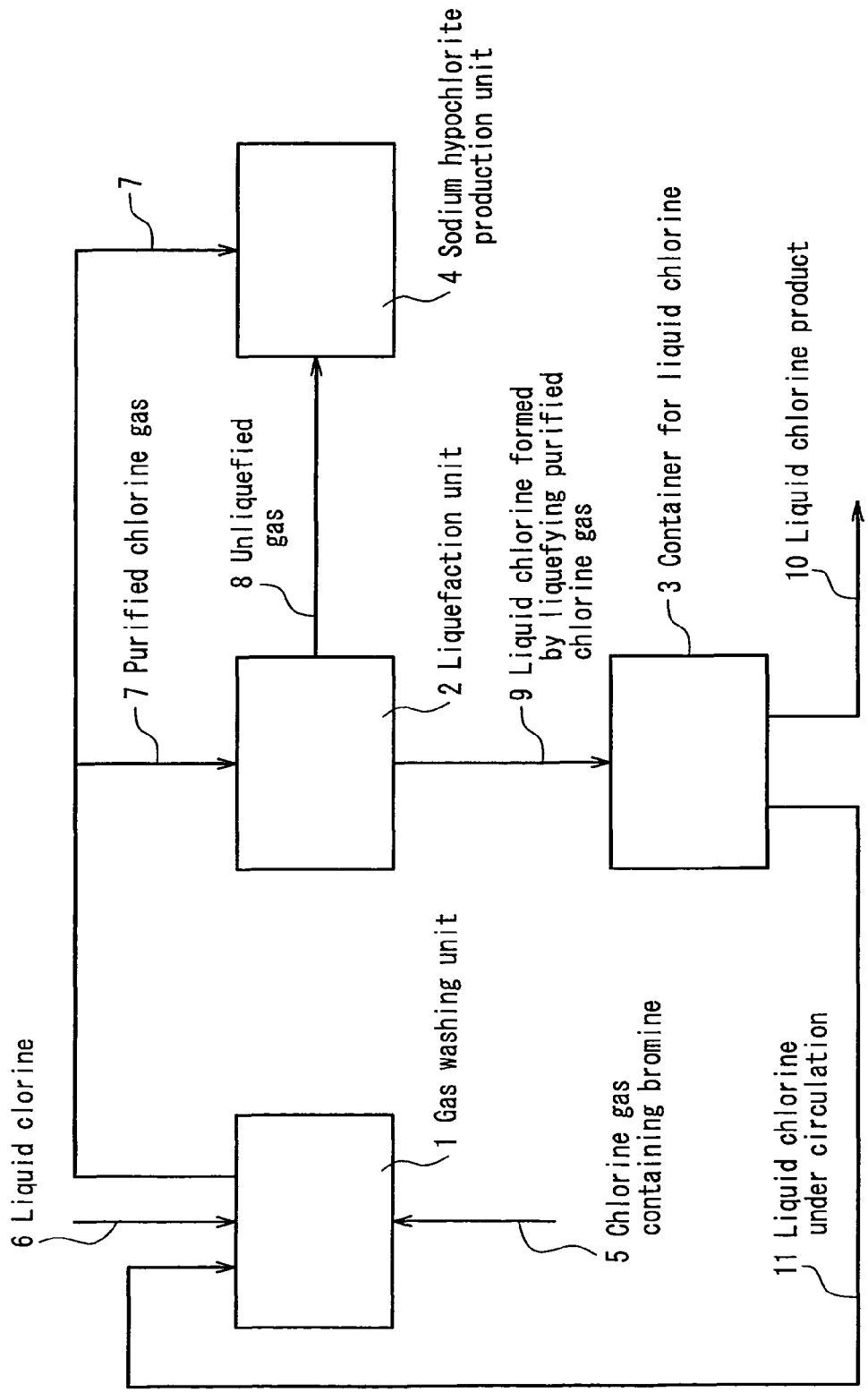
FIG. 1 explains a method of the present invention for producing a chlorine gas and a liquid chlorine, and a method of the present invention for producing an aqueous sodium hypochlorite solution.

The method for producing a chlorine gas according to the present invention includes the steps of:

(A) washing a chlorine gas that contains bromine, in a gas washing unit composed of a packed column or a tray tower, wherein the chlorine gas introduced via a lower part of the gas washing unit is brought into counterflow gas/liquid contact with a liquid chlorine introduced via an upper part of the gas washing unit; and (B) taking out a purified chlorine gas thus washed, via the upper part of the gas washing unit, wherein a weight ratio of the chlorine gas and the liquid chlorine introduced in the step (A) is 1/1.0 to 1/0.3.

The following describes a chlorine gas producing method of the present invention, while referring to FIG. 1. In FIG. 1, 1 denotes a gas washing unit, 2 denotes a liquefaction unit, 3 denotes a container for liquid chlorine, 4 denotes a sodium hypochlorite production unit, 5 denotes a chlorine gas containing bromine, 6 denotes a liquid chlorine, 7 denotes a purified chlorine gas, 8 denotes an unliquefied gas, 9 denotes a liquid chlorine obtained by liquefying the purified chlorine gas 7, 10 denotes a liquid chlorine product, and 11 denotes a liquid chlorine under circulation.

In the chlorine gas producing method of the present invention, a packed column or a tray tower is used as the gas washing unit 1. The size of the packed column or the tray tower can be selected appropriately according to the amount of chlorine gas introduced therein, the amount of bromine contained in the chlorine gas, etc.

In the case where a packed column is used as the gas washing unit 1, any one of various types of irregular packing materials or regular packing materials can be used as the packing material to be packed in the packed column. However, specifically, it is preferable to use Raschig rings or interlocked saddles made of ceramic or carbon, since the degradation of a material and the contamination due to a substance eluted from the material can be avoided. The height of the packed section is determined appropriately according to the size of the packed column, etc.

In the case where a tray tower is used as the gas washing unit 1, the trays may be sieve trays, bubble trays, valve trays, flexible trays, or the like. The trays preferably are, among those described above, sieve trays or bubble trays having no movable parts in particular, since adhesion of chlorides to movable parts, which could lead to degradation of performance, does not occur.

The number of theoretical plates of the gas washing unit 1 can be determined according to a weight ratio of a chlorine gas and a liquid chlorine introduced in the step (A) and the desired content of bromine in chlorine to be taken out via an upper part of the washing unit. If the weight ratio of chlorine gas/liquid chlorine is small, the number of theoretical plates may be small. On the other hand, if the weight ratio of chlorine gas/liquid chlorine is larger, a larger number of theoretical plates are required. More specifically, when the weight ratio of chlorine gas/liquid chlorine is 1/1.0 to 1/0.6, the number of theoretical plates preferably is 3 to 5, and more preferably 4 to 5. When the weight ratio of chlorine gas/liquid chlorine is 1/0.6 to 1/0.3, the number of theoretical plates preferably is 5 to 10, and more preferably 5 to 6. Besides, from the viewpoint of decreasing the bromine content from the ppm order to the ppb order, the number of theoretical plates preferably is not less than 10. On the other hand, from the viewpoint of reducing the running cost and the initial cost of the unit, the number of theoretical plates preferably is 3 to 10, and more preferably 4 to 6.

In the chlorine gas producing method of the present invention, in the gas washing unit 1 composed of a packed column or a tray tower, the chlorine gas 5, which contains bromine and is introduced via a lower part of the gas washing unit 1 is brought into counterflow gas/liquid contact with the liquid chlorine 6 introduced via the upper part of the gas washing unit 1, so as to be washed. Thus, bromine is removed from the chlorine gas 5.

In the step (A), a chlorine gas obtained by electrolysis of an aqueous solution of crude salt can be used as the chlorine gas 5 containing bromine, which is introduced into the gas washing unit 1. Further, it also is possible to use a liquid chlorine purified and gasified by another method, as the chlorine gas 5. As the method of the foregoing purification, the multistage purification, the single distillation, the flash vaporization, or the like can be used. Particularly when a chlorine gas obtained by separating and purifying a non-condensable gas in a distillation column is used as the supplied chlorine gas 5 in the method of the present invention, the purified liquid chlorine 9 and the purified chlorine gas 7 can be allowed to have extremely high purities, which is preferable. The content of bromine in such a chlorine gas is determined according to the concentration of bromide in crude salt. The crude salt consumed in Japan is mainly Mexican salt or Australian salt, and a chlorine gas obtained from such a salt contains bromine of about 100 ppm by volume.

A chlorine gas at about 90° C. generated from the electrolytic vessel when an aqueous solution of crude salt is subjected to electrolysis is washed, cooled, and thereafter dried with the use of sulfuric acid. Thereafter, the gas is compressed to 0.3 to 0.5 MPa by a compressor, while being cooled by an intercooler to 40 to 50° C., and is introduced to the gas washing unit 1 as the chlorine gas 5. If the cooling temperature at the intercooler is high, the efficiency of the compressor decreases, and the consumed power increases. Besides, carbon steel pipes might be corroded. On the other hand, if the cooling temperature is excessively low, a chlorine gas is condensed, and the pressure cannot be maintained. Besides, chilled water is needed as cooling water used in a cooler for decreasing the gas temperature, which leads to an increase in the costs. If the compression pressure is increased, a chlorine gas is condensed in the pipes, and it becomes difficult to maintain the pressure stably. On the other hand, if the pressure is decreased, the liquefaction unit needs a cooling medium of a further lower temperature when a chlorine gas is liquefied, which leads to an increase in the costs.

The feeding rate of the chlorine gas 5 is not limited particularly, and is determined appropriately according to the production amount.

The column gas flow rate of the chlorine gas 5 (0° C., 1 atm=101325 Pa) preferably is 0.2 to 3.0 m/sec, more preferably 0.5 to 2.0 m/sec, and further preferably 0.8 to 1.5 m/sec. By setting the column gas flow rate to 0.2 to 3.0 m/sec, it is possible to perform a stable operation while the amount of bromine in the purified chlorine gas 7 obtained from the upper part of the gas washing unit 1 is maintained at a desirable value, without causing flooding, channeling, or weeping. Here, the column gas flow rate refers to an output amount (fold) of the gas with respect to the empty column volume of the gas washing unit 1 per unit time. Therefore, as this value is higher, the gas washing unit facility is downsized further.

As the liquid chlorine 6 introduced via the upper part of the gas washing unit 1, as described above, a liquid chlorine obtained by liquefying, with use of the liquefaction unit, the chlorine gas obtained by electrolysis of an aqueous solution of crude salt can be used. A liquid chlorine is commercially available in a state of being filled in a bomb or a tank. However, in the chlorine gas producing method of the present invention, a liquid chlorine before being filled in a tank can be used instead. For example, a part of the liquid chlorine 9 obtained by liquefying the purified chlorine gas 7 with use of the liquefaction unit 2, which becomes the liquid chlorine 11 under circulation, may be used as the liquid chlorine 6 to be introduced via the upper part of the gas washing unit 1. Still further, as the liquid chlorine 6 introduced via the upper part of the gas washing unit 1, a liquid chlorine purified by another method can be used. For example, a liquid chlorine that is purified by the multistage purification, the single distillation, the flash vaporization, or the like, mixed with the liquid chlorine 11 under circulation, may be used.

The chlorine gas obtained by subjecting an aqueous solution of crude salt to electrolysis contains bromine in an amount of about 100 ppm by volume, as described above, and a liquid chlorine obtained by liquefying such a chlorine gas contains impurities of about 200 ppm by weight, which, however, varies with the liquefaction ratio. In the chlorine gas producing method of the present invention, the content of impurities in a liquid chlorine used as the liquid chlorine 6 preferably is 0 to 200 ppm by weight, more preferably 0 to 150 ppm by weight, further preferably 0 to 50 ppm by weight, and particularly preferably 0 to 10 ppm by weight. By setting the content of impurities to 0 to 200 ppm by weight, the amount of bromine contained in the purified chlorine gas obtained via the column top of the gas washing unit 1 can be reduced without a significant increase in the running costs.

The temperature of the liquid chlorine 6 introduced into the gas washing unit 1 is not limited particularly, and may be not higher than a temperature that allows the liquid chlorine 6 to vaporize under pressure of the gas washing unit 1.

The feeding rate of the liquid chlorine 6 is not limited particularly, and is determined according to the amount of the chlorine gas 5 introduced into the gas washing unit 1.

The ratio by weight of the chlorine gas 5, which contains bromine and is introduced into the gas washing unit 1, to the liquid chlorine 6 is 1/1.0 to 1/0.3, preferably 1/0.9 to 1/0.5, and more preferably 1/0.8 to 1/0.6. By setting the ratio by weight to 1/1.0 to 1/0.3, the amount of bromine in the purified chlorine gas 7 obtained via the column top of the gas washing unit 1 can be reduced without a significant increase in the running costs The column top pressure of the gas washing unit 1 upon the contact of the chlorine gas 5 with the liquid gas 6 preferably is 0.1 to 0.6 MPa, more preferably 0.2 to 0.5 MPa, and further preferably 0.3 to 0.4 MPa. By setting the column top pressure to 0.1 to 0.6 MPa, the chlorine gas 5 containing bromine can be purified without use of a chlorine gas compressor, a washing unit, or a liquefaction unit having a large capacity.

In the chlorine gas producing method of the present invention, the purified chlorine gas 7 obtained by bringing the chlorine gas 5 containing a bromine gas, and the liquid chlorine 6 into counterflow gas/liquid contact in the gas washing unit 1 is taken out via the upper part of the gas washing unit 1. On the other hand, bromine removed from the chlorine gas 5 is discharged along with a liquid chlorine via the lower part of the gas washing unit 1.

The content of bromine in the purified chlorine gas 7 preferably is 0 to 50 ppm by volume, more preferably 0 to 25 ppm by volume, and more preferably 0 to 10 ppm by volume. By setting the content of bromine in the purified chlorine gas 7 to 0 to 50 ppm by volume, a desired aqueous sodium hypochlorite solution can be obtained.

The purified chlorine gas 7 taken out of the gas washing unit 1 is fed to the sodium hypochlorite production unit 4, so as to be used for producing an aqueous sodium hypochlorite solution, but the purified chlorine gas 7 can be used also for other purposes such as the production of hydrochloric acid. Further, the purified chlorine gas 7 may be liquefied by the liquefaction unit 2 so that a liquid chlorine 9 can be produced (step (C)). The percentage of the purified chlorine gas 7 to be liquefied by the liquefaction unit 2 preferably is 50 to 90 percent by weight (wt %), more preferably 60 to 85 wt %, and further preferably 70 to 80 wt %, of the purified chlorine gas taken out of the gas washing unit 1. By setting the percentage to 50 to 90 wt %, the amount of bromine in the purified chlorine gas 7 can be reduced without a significant increase in the running costs.

The method for liquefying the purified chlorine gas 7 is not limited particularly, and the chlorine gas 7 can be liquefied by a usual method, for example, a method wherein the temperature is set to 30° C. when the pressure is set to 0.75 to 1.5 MPa (the high pressure method), a method wherein the temperature is set to 15 to −35° C. when the pressure is set to 0.2 to 0.7 MPa (the medium pressure method), or a method wherein the temperature is set to not higher than −25° C. when the pressure is set to 0 to 0.3 MPa (the low pressure method).

The liquid chlorine 9 liquefied by the liquefaction unit 2 is fed to the container 3 for liquid chlorine, whereas the unliquefied gas 8, which is not liquefied, is fed to the sodium hypochlorite production unit 4 like the purified chlorine gas 7 so as to be used in the production of an aqueous sodium hypochlorite solution.

After being fed to the container 3 for liquid chlorine, the liquid chlorine 9 can be used as the liquid chlorine product 10 and the liquid chlorine 11 under circulation. Further, the liquid chlorine product 10 is guided to the distillation column so that a high-purity liquid chlorine is provided via the column bottom, with an uncondensed gas contained in a liquid chlorine being separated via the column top. The high-purity liquid chlorine can be used for, for example, semiconductors. The liquid chlorine 11 under circulation preferably is used as a part or an entirety of the liquid chlorine 6 introduced via the upper part of the gas washing unit 1 in the step (A). Of the liquid chlorine 9 liquefied by the liquefaction unit 2, the part used as the liquid chlorine 11 under circulation preferably is 50 to 100 wt %, more preferably 60 to 90 wt %, and further preferably 70 to 80 wt %. By setting the part to 50 to 100 wt %, the amount of bromine in the purified chlorine gas 7 can be reduced without a significant increase in the running costs.

Thus, in the chlorine gas producing method of the present invention, a part or an entirety of the liquid chlorine 9 obtained in the step (C) by liquefying the purified chlorine gas 7 taken out of the gas washing unit 1 in the step (B) can be used, as the liquid chlorine 11 under circulation, for washing the chlorine gas 5 again in Step (A).

Further, in the present invention, a part or an entirety of the liquid chlorine 9 obtained by liquefaction in Step (C) is fed as the liquid chlorine product 10 to another reservoir, so that liquid chloride to be used in the production of products such as organic chloride compounds can be obtained. The content of bromine in the liquid chlorine thus obtained preferably is not more than 10 ppm by weight, and more preferably not more than 6 ppm by weight. The lower limit of the same is not limited particularly, and preferably is as low as possible. By setting the content of bromine to not more than 6 ppm by weight, the content of bromine in a product such as an organic chlorine compound made from liquid chloride can be reduced, whereby the degradation or discoloration of a product, or corrosion can be reduced.

The purified chlorine gas 7 produced by the chlorine gas producing method of the present invention, having a smaller content of bromine therein, advantageously is used as a raw material for an aqueous sodium hypochlorite solution with a smaller content of bromic acid generated with bromine. The method for producing an aqueous sodium hypochlorite solution is not limited particularly, but, for example, an aqueous sodium hypochlorite solution with a bromic acid content of not more than 30 mg/L can be produced through a process of causing the chlorine gas produced by the above-described chlorine gas producing method of the present invention to react with an aqueous sodium hydroxide solution in the sodium hypochlorite production unit 4. More specifically, the aqueous sodium hydroxide solution is supplied continuously to a vessel with stirring equipment, and is circulated through a reaction column (packed column) via a cooler so that the liquid temperature is maintained at 25 to 30° C. A chlorine gas is supplied continuously to the reaction column so that sodium hypochlorite is generated. The sodium hypochlorite generated in the reaction column is fed to the foregoing vessel. The liquid in the foregoing vessel is circulated, while a part thereof is drawn out continuously, so that common salt precipitated is separated by a centrifuge. The aqueous sodium hypochlorite solution separated from common salt is fed to a concentration adjusting vessel, diluted to a predetermined sodium hypochlorite concentration with pure water, and is fed to a product reservoir via a filter.

As the chlorine gas to be used in the production of an aqueous sodium hypochlorite solution, not only the purified chlorine gas 7 taken out of the gas washing unit 1, but also the unliquefied gas 8, not having been liquefied in the liquefaction unit 2, may be used. The content of bromine in these chlorine gases preferably is not more than 50 ppm by volume, more preferably not more than 40 ppm by volume, and further preferably not more than 30 ppm by volume. By setting the content of bromine to not more than 50 ppm by volume, sodium hypochlorite with a smaller content of bromic acid can be produced.

The concentration of the aqueous sodium hydroxide solution preferably is 30 to 55 wt %, more preferably 40 to 50 wt %, and further preferably 45 to 48 wt %. By setting the concentration to 30 to 55 wt %, an aqueous sodium hypochlorite solution with a smaller concentration of common salt can be produced stably.

The reaction of a chlorine gas with an aqueous sodium hydroxide solution preferably is carried out at 15 to 45° C., more preferably at 20 to 40° C., and further preferably at 25 to 30° C. By setting the reaction temperature to 15 to 45° C., the aqueous sodium hypochlorite solution with a lower concentration of common salt can be produced stably.

In the method of the present invention for producing an aqueous sodium hypochlorite solution, after a chlorine gas is caused to react with an aqueous sodium hydroxide solution, common salt precipitated is separated by solid-liquid separation, whereby an aqueous sodium hypochlorite solution can be obtained.

The content of a bromic acid in the obtained aqueous sodium hypochlorite solution, is not more than 30 mg/L, preferably not more than 10 mg/L, and more preferably not more than 7 mg/L. By setting the bromic acid content to not more than 30 mg/L, an aqueous sodium hypochlorite solution (product) with a low bromic acid concentration as follows can be obtained: the bromic acid concentration is such that when the foregoing solution is added to drinking water, a bromic acid concentration is significantly lower than the conventional evaluation reference value (a concentration such that a bromic acid concentration when 150 mg of the product is added to 1 L of drinking water is not more than 0.005 mg/L). It should be noted that the bromic acid concentration of the aqueous sodium hypochlorite solution is determined by transferring a filtered liquid obtained upon the solid-liquid separation toward a dilution vessel, diluting the solution with water so that the effective chlorine concentration becomes 13 wt %, and subjecting the same to analysis by ion chromatography.

An aqueous sodium hypochlorite solution obtained by the method of the present invention for producing an aqueous sodium hypochlorite solution can be used widely for various purposes, as a product having a bromic acid content satisfactory with respect to a specified value.

EXAMPLES

Example 1

A packed column having an inner diameter of 300 mm filled with Raschig rings having a diameter of 1 inch and a height of 1 inch (magnetic (made of ceramic)) (the height of packed section: 3000 mm) was used as a gas washing unit 1, and a chlorine gas 5 containing 1000 ppm by volume of bromine (temperature: 20° C., pressure: 0.45 MPa) was fed at a rate of 1500 kg/hour via a lower part of the gas washing unit 1, while a liquid chlorine 6 (temperature: 0° C.) containing 100 ppm by weight of bromine was supplied via an upper part of the gas washing unit 1. The weight ratio of the chlorine gas 5 and the liquid chlorine 6 was 1/0.4. Under conditions such that the gas flow rate of the chlorine gas in the column was 2230 kg/hour, the retention time was set to 1.6 seconds, and the column top pressure of the packed column 1 was 0.4 MPa, the chlorine gas 5 and the liquid chlorine 6 were brought into contact with each other. The bromine content of a purified chlorine gas 7 discharged via the upper part of the packed column 1 was 22 ppm by volume. The entire amount of the purified chlorine gas 7 was fed to a liquefaction unit 2 (pressure: 0.4 MPa, temperature: −2 to −3° C.), so that 50 wt % of the same was liquefied. The bromine content of a liquid chlorine 9 thus obtained was 44 ppm by weight. The bromine content of an unliquefied gas 8 was 11 ppm by volume.

Example 2

A liquid chlorine 9 having a bromine content of 44 ppm by weight, obtained in Example 1, was supplied via the upper part of the gas washing unit 1 at a rate of 600 kg/hour, so that it was brought into contact with a chlorine gas 5 under the same conditions as those of Example 1. The weight ratio of the chlorine gas 5 and the liquid chlorine 6 was set to 1/0.4. The bromine content of the purified chlorine gas 7 discharged via the upper part of the packed column 1 was 14.6 ppm by volume. The entire amount of the purified chlorine gas 7 was fed to a liquefaction unit 2 (pressure: 0.4 MPa, temperature: −2 to −3° C.), so that 50 wt % of the same was liquefied. The bromine content of an unliquefied gas was 7.7 ppm by volume.

Comparative Example 1

The chlorine gas 5 and pure water were brought into contact with each other under the same conditions as those of Example 1 except that pure water at 20° C., not containing bromine, was supplied via the upper part of the gas washing unit 1. The bromine content of a chlorine gas discharged via the upper part of the packed column 1 was 98 ppm by volume. After moisture was removed from the foregoing chlorine gas, the entire amount thereof was fed to the liquefaction unit 2 (pressure: 0.4 MPa, temperature: −2 to −3° C.), so that 50 wt % of the same was liquefied. The bromine content of an unliquefied gas was 44 ppm by volume.

Example 3

A tray tower having an inner diameter of 350 mm, provided with five trays at a tray interval of 400 mm, was used as a gas washing unit 1, and a chlorine gas 5 containing 86 ppm by volume of bromine (temperature: 24° C., pressure: 0.46 MPa)

was fed at a rate of 1400 kg/hour via a lower part of the gas washing unit 1, while a liquid chlorine 6 (temperature: 0° C.) containing 80 ppm by weight of bromine was supplied via an upper part of the gas washing unit 1. The weight ratio of the chlorine gas 5 and the liquid chlorine 6 was 1/0.4. Under the column top pressure of the tray tower of 0.43 MPa, the chlorine gas 5 and the liquid chlorine 6 were brought into contact with each other. The bromine content of a purified chlorine gas 7 discharged via the upper part of the gas washing unit 1 was 19.6 ppm by volume. The entire amount of the purified chlorine gas 7 was fed to a liquefaction unit 2 (pressure: 0.4 MPa, temperature: −2 to −3° C.), so that 60 wt % of the same was liquefied. The bromine content of an unliquefied gas 8 was 8.5 ppm by volume.

Example 4

The chlorine gas having a bromine content of 11 ppm by volume, obtained in Example 1, and an aqueous sodium hydroxide solution having a concentration of 48.5 wt % were caused to react with each other at 25 to 30° C., and common salt precipitated was separated by solid-liquid separation. The filtered liquid obtained was transferred to a dilution vessel, and was diluted with water so that the effective chlorine concentration became 13 wt %. A bromic acid concentration of an aqueous sodium hypochlorite solution (product) thus obtained was analyzed by ion chromatography in a manner described below. The bromic acid concentration thus determined was 6 ppm by weight (6.9 mg/L).

<Ion Chromatography>

A sample solution obtained by adding hydrogen peroxide to a sample so that sodium hypochlorite was decomposed, and diluting the sample with ion-exchange water, was measured by using an ion chromatography analyzer manufactured by Dionex Corporation (detector: equipped with a conductivity suppressor, separator column: IonPac AS9-HC, 4×250 mm, guard column: IonPac AG9-HC, eluent; aqueous $Na_2CO_3$ solution, 9 mM), and was quantified with use of a calibration curve based on a peak area.

The bromine concentration in a chlorine gas was calculated in the following manner.

The chlorine gas containing bromine was caused to be absorbed in a sodium hydroxide solution, so that a sodium hypochlorite solution was obtained. Bromic acid generated was analyzed by ion chromatography, and was measured in terms of bromine in the chlorine gas. According to this method, the detection limit as to the bromine concentration in the chlorine gas was 3 ppm by volume.

Example 5

An aqueous sodium hypochlorite solution was prepared in the same manner as that of Example 4 except that a chlorine gas having a bromine content of 7.7 ppm by volume, obtained in Example 2, was used for the chlorine gas. The obtained aqueous sodium hypochlorite solution (product) had a bromic acid concentration of 5 ppm by weight (5.7 mg/L).

Comparative Example 2

An aqueous sodium hypochlorite solution was prepared in the same manner as that of Example 4 except that a chlorine gas having a bromine content of 100 ppm by volume was used for the chlorine gas. The obtained aqueous sodium hypochlorite solution (product) had a bromic acid concentration of 48 ppm by weight (55 mg/L).

Example 6

A tray tower having an inner diameter of 400 mm, a height of 4500 mm, provided with eight trays, was used as a gas washing unit 1, and a chlorine gas 5 containing 104 ppm by volume of bromine (temperature: 30° C., pressure: 0.3 MPa) was fed at a rate of 2200 kg/hour via a lower part of the gas washing unit 1, while a liquid chlorine 6 (temperature: 0° C.) containing 6 ppm by weight of bromine was supplied at a rate of 1540 kg/hour via an upper part of the gas washing unit 1. The weight ratio of the chlorine gas 5 and the liquid chlorine 6 was 1/0.7. Under the column top pressure of the tray tower of 0.3 MPa, the chlorine gas 5 and the liquid chlorine 6 were brought into contact with each other. The bromine content of a purified chlorine gas 7 discharged via the upper part of the gas washing unit 1 was less than 3 ppm by volume. The entire amount of the purified chlorine gas 7 was fed to a liquefaction unit 2 (pressure: 0.3 MPa, temperature: 0 to −5° C.), so that 70 wt % of the same was liquefied. The bromine content in a liquid chlorine 9 obtained was less than 6 ppm by weight. The bromine content of an unliquefied gas 8 was less than 3 ppm by volume.

Example 7

The unliquefied chlorine gas having a bromine content of less than 3 ppm by volume, obtained in Example 6, and an aqueous sodium hydroxide solution having a concentration of 48.5 wt % were caused to react with each other at 25 to 30° C., and common salt precipitated was separated by solid-liquid separation. The filtered liquid obtained was transferred to a dilution vessel, and was diluted with water so that the effective chlorine concentration became 13.5 wt %. A bromic acid concentration of an aqueous sodium hypochlorite solution (product) thus obtained was analyzed by ion chromatography described above. The bromic acid concentration thus determined was 1.5 ppm by weight (1.7 mg/L).

Example 8

A tray tower having an inner diameter of 400 mm, a height of 4500 mm, and provided with eight trays, was used as a gas washing unit 1, and a chlorine gas 5 containing 132 ppm by volume of bromine (temperature: 28° C., pressure: 0.3 MPa) was fed at a rate of 1268 kg/hour via a lower part of the gas washing unit 1, while a liquid chlorine 6 (temperature: 0° C.) containing 6 ppm by weight of bromine was supplied at a rate of 888 kg/hour via an upper part of the gas washing unit 1. The weight ratio of the chlorine gas 5 and the liquid chlorine 6 was 1/0.7. Under the column top pressure of the tray tower of 0.3 MPa, the chlorine gas 5 and the liquid chlorine 6 were brought into contact with each other. The bromine content of a purified chlorine gas 7 discharged via the upper part of the gas washing unit 1 was less than 3 ppm by volume. The entire amount of the purified chlorine gas 7 was fed to a liquefaction unit 2 (pressure: 0.3 MPa, temperature: 0 to −5° C.), so that 70 wt % of the same was liquefied. The bromine content in the liquid chlorine 9 obtained was less than 6 ppm by weight. The bromine content of an unliquefied gas 8 was less than 3 ppm by volume.

Examples 9 to 16

Purified chlorine gases 7 were obtained in the same manner as that of Example 8, except that the feeding rate of the chlorine gas 5, the feeding rate of the liquid chlorine 6, and the weight ratio of the chlorine gas 5 and the liquid chlorine 6 were changed to those shown in Table 1. The liquefaction ratios of the obtained purified chlorine gases 7, the bromine contents in the purified chlorine gases 7, the bromine contents in the obtained liquid chlorines 9, and the bromine contents in the unliquefied gases 8 also are shown in Table 1.

TABLE 1

|  | Feeding rate of chlorine gas 5 (kg/hour) | Feeding rate of liquid chlorine 6 (kg/hour) | Weight ratio of chlorine gas 5 and liquid chlorine 6 | Liquefaction ratio (wt %) | Bromine content in purified chlorine gas 7 (ppm by volume) | Bromine content in liquid chlorine 9 (ppm by weight) | Bromine content in unliquefied gas 8 (ppm by volume) |
|---|---|---|---|---|---|---|---|
| Ex. 8 | 1268 | 888 | 1/0.70 | 70 | <3 | <6 | <3 |
| Ex. 9 | 1426 | 1055 | 1/0.74 | 74 | <3 | <6 | <3 |
| Ex. 10 | 1585 | 1220 | 1/0.77 | 77 | <3 | <6 | <3 |
| Ex. 11 | 1743 | 1318 | 1/0.76 | 76 | <3 | <6 | <3 |
| Ex. 12 | 1902 | 1407 | 1/0.74 | 74 | <3 | <6 | <3 |
| Ex. 13 | 2060 | 1566 | 1/0.76 | 76 | <3 | <6 | <3 |
| Ex. 14 | 2219 | 1623 | 1/0.73 | 73 | <3 | <6 | <3 |
| Ex. 15 | 2409 | 1848 | 1/0.77 | 77 | <3 | <6 | <3 |
| Ex. 16 | 2536 | 1949 | 1/0.77 | 77 | <3 | <6 | <3 |

Example 17

A tray tower having an inner diameter of 400 mm, a height of 4500 mm, provided with eight trays, was used as a gas washing unit 1, and a chlorine gas 5 containing 104 ppm by volume of bromine (temperature: 30° C., pressure: 0.3 MPa) was fed at a rate of 1902 kg/hour via a lower part of the gas washing unit 1, while a liquid chlorine 6 (temperature: 0° C.) containing less than 6 ppm by weight of bromine was supplied at a rate of 950 kg/hour via an upper part of the gas washing unit 1. The weight ratio of the chlorine gas 5 and the liquid chlorine 6 was 1/0.5. Under the column top pressure of the tray tower of 0.3 MPa, the chlorine gas 5 and the liquid chlorine 6 were brought into contact with each other. The bromine content of a purified chlorine gas 7 discharged via the upper part of the gas washing unit 1 was less than 3 ppm by volume. The entire amount of the purified chlorine gas 7 was fed to a liquefaction unit 2 (pressure: 0.3 MPa, temperature: 0 to −5° C.), so that 70 wt % of the same was liquefied. The bromine content in a liquid chlorine 9 obtained was less than 6 ppm by weight. 27 wt % of the obtained liquefied chlorine 9 was introduced to another reservoir as a liquid chlorine product 10, while 73 wt % of the liquid chlorine 9 was introduced as a liquid chlorine 11 under circulation to the gas washing unit 1 via the upper part thereof. The bromine content of an unliquefied gas 8 was less than 3 ppm by volume.

Example 18

The unliquefied chlorine gas having a bromine content of less than 3 ppm by volume, obtained in Example 17, and an aqueous sodium hydroxide solution having a concentration of 48.5 wt % were caused to react with each other at 25 to 30° C., and common salt precipitated was separated by solid-liquid separation. The filtered liquid obtained was transferred to a dilution vessel, and was diluted with water so that the effective chlorine concentration became 13.5 wt %. A bromic acid concentration of an aqueous sodium hypochlorite solution (product) thus obtained was analyzed by ion chromatography as described above. The bromic acid concentration thus determined was less than 1.5 ppm by weight (1.7 mg/L).

INDUSTRIAL APPLICABILITY

By the chlorine gas producing method of the present invention, a high-purity chlorine gas having a smaller content of bromine as impurities can be produced. Therefore, by using the chlorine gas thus obtained, an aqueous sodium hypochlorite solution having a smaller content of bromic acid generated with bromine can be produced. Further, by the liquid chlorine producing method of the present invention, a high-purity liquid chlorine having a smaller content of bromine as impurities can be produced.

The invention claimed is:

1. A method for producing a chlorine gas, comprising the steps of:
   (A) washing a chlorine gas that contains bromine, in a gas washing unit comprising a packed column or a tray tower, wherein the chlorine gas introduced via a lower part of the gas washing unit is brought into counterflow gas/liquid contact with a liquid chlorine introduced via an upper part of the gas washing unit; and
   (B) taking out a purified chlorine gas thus washed, via the upper part of the gas washing unit,
   wherein a weight ratio of the chlorine gas relative to the liquid chlorine introduced in the step (A) is 1/1.0 to 1/0.3, and
   temperature of the liquid chlorine introduced via the upper part of the gas washing unit is controlled so as not to vaporize under pressure in the gas washing unit when introduced to the gas washing unit.

2. The method according to claim 1, further comprising the step of:
   (C) liquefying the purified chlorine gas taken out via the upper part of the gas washing unit, by using a liquefaction unit, whereby a liquid chlorine is obtained,
   wherein in the step (A), the liquid chlorine obtained in the step (C) is introduced via the upper part of the gas washing unit.

3. The method according to claim 2, wherein in the step (C), the purified chlorine gas to be liquefied is 50 to 90 wt % of the purified chlorine gas taken out in the step (B).

4. The method according to claim 2, wherein in the step (A), 50 to 100 wt % of the liquid chlorine obtained in the step (C) is introduced via the upper part of the gas washing unit.

5. The method according claim 1, wherein a column gas flow rate of the chlorine gas at 0° C. under 101325 Pa is in a range of 0.2 to 3.0 m/sec.

6. The method according to claim 1, wherein a column top pressure of the gas washing unit when the chlorine gas containing bromine and the liquid chlorine are brought into contact with each other is in a range of 0.1 to 0.6 MPa.

7. The method according to claim 1, wherein a content of bromine in the purified chlorine gas is in a range of 0 to 50 ppm by volume.

8. The method according to claim 1, wherein a weight ratio of the chlorine gas containing bromine, introduced into the gas washing unit, and the liquid chlorine is in a range of 1/0.9 to 1/0.5.

9. A method for producing a liquid chlorine, the method comprising the step of liquefying a chlorine gas, the chlorine gas being produced by a method including the steps of:
  (A) washing a chlorine gas that contains bromine, in a gas washing unit comprising a packed column or a tray tower, wherein the chlorine gas introduced via a lower part of the gas washing unit is brought into counterflow gas/liquid contact with a liquid chlorine introduced via an upper part of the gas washing unit; and
  (B) taking out a purified chlorine gas thus washed, via the upper part of the gas washing unit,
  wherein a weight ratio of the chlorine gas relative to the liquid chlorine introduced in the step (A) is 1/1.0 to 1/0.3,
  a liquid chlorine having a bromine content of not more than 10 ppm by weight is obtained, and
  temperature of the liquid chlorine introduced via the upper part of the gas washing unit is controlled so as not to vaporize under pressure in the gas washing unit when introduced to the gas washing unit.

10. The method according to claim 9, further comprising the step of:
  (C) liquefying the purified chlorine gas taken out via the upper part of the gas washing unit, by using a liquefaction unit, whereby a liquid chlorine is obtained,
  wherein in the step (A), the liquid chlorine obtained in the step (C) is introduced via the upper part of the gas washing unit.

11. The method according to claim 10, wherein in the step (C), the purified chlorine gas to be liquefied is 50 to 90 wt % of the purified chlorine gas taken out in the step (B).

12. The method according to claim 10, wherein in the step (A), 50 to 100 wt % of the liquid chlorine obtained in the step (C) is introduced via the upper part of the gas washing unit.

13. The method according to claim 9, wherein a column top pressure of the gas washing unit when the chlorine gas containing bromine and the liquid chlorine are brought into contact with each other is in a range of 0.1 to 0.6 MPa.

14. The method according to claim 9, wherein a content of bromine in the purified chlorine gas is in a range of 0 to 50 ppm by volume.

* * * * *